United States Patent [19]
Van Den Berg et al.

[11] Patent Number: 5,351,388
[45] Date of Patent: Oct. 4, 1994

[54] CABLE LOCKING AND SEALING PROCESS FOR SENSOR

[75] Inventors: David Van Den Berg, Markleeville, Calif.; Eric C. Peterson; David M. Saarem, both of Minden, Nev.; Dennis D. De Lange, Gardnerville, Nev.

[73] Assignee: Bently Nevada Corporation, Minden, Nev.

[21] Appl. No.: 127,955

[22] Filed: Sep. 28, 1993

Related U.S. Application Data

[63] Continuation-in-part of Ser. No. 887,177, May 21, 1992, abandoned.

[51] Int. Cl.$^5$ .............................. H01F 41/02
[52] U.S. Cl. .................... 29/602.1; 29/828; 264/272.15; 264/272.19; 324/207.15; 336/205
[58] Field of Search ............... 29/602.1, 828; 264/272.15, 272.19; 324/207.15; 336/205

[56] References Cited

U.S. PATENT DOCUMENTS 5,016,343  5/1991  Schutts.
5,021,737  6/1991  Schutts.

Primary Examiner—Carl E. Hall
Attorney, Agent, or Firm—Flehr, Hohbach, Test, Albritton & Herbert

[57] ABSTRACT

A sensor has a metal case with a sensing coil at one end and a shielded cable extending from the other. In one use it is placed in proximity to rotating machinery to sense imbalance by position change of the shaft. A pair of suitably sized metal cylinders which are precisely interlocked by dielectric material provides for firm mechanical and electrical connections to the inner and outer conductors of the associated shielded cable. In addition a four step injection molding process provides for accurate and secure location of the sensing coil. And at the same time the entire structure because of the injection molding and associated seals is moisture proof. Other uses include temperature and velocity sensing.

In an alternative embodiment only a two-step injection molding process is utilized with a somewhat simplified procedure.

21 Claims, 8 Drawing Sheets

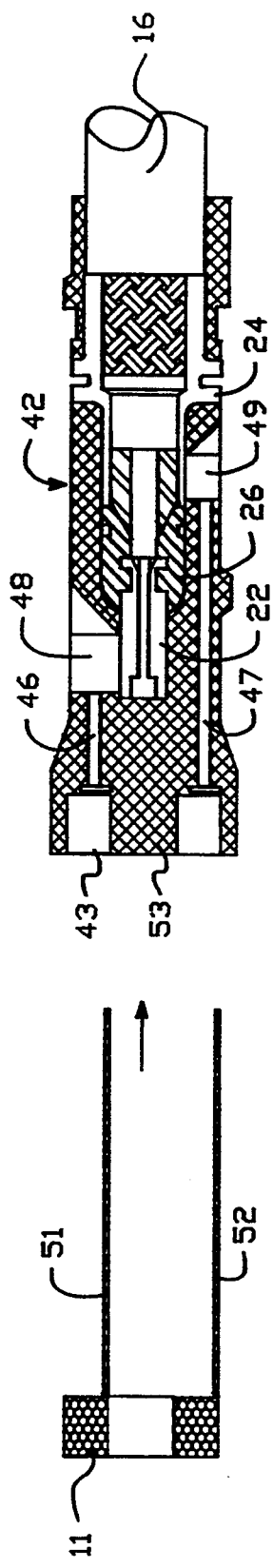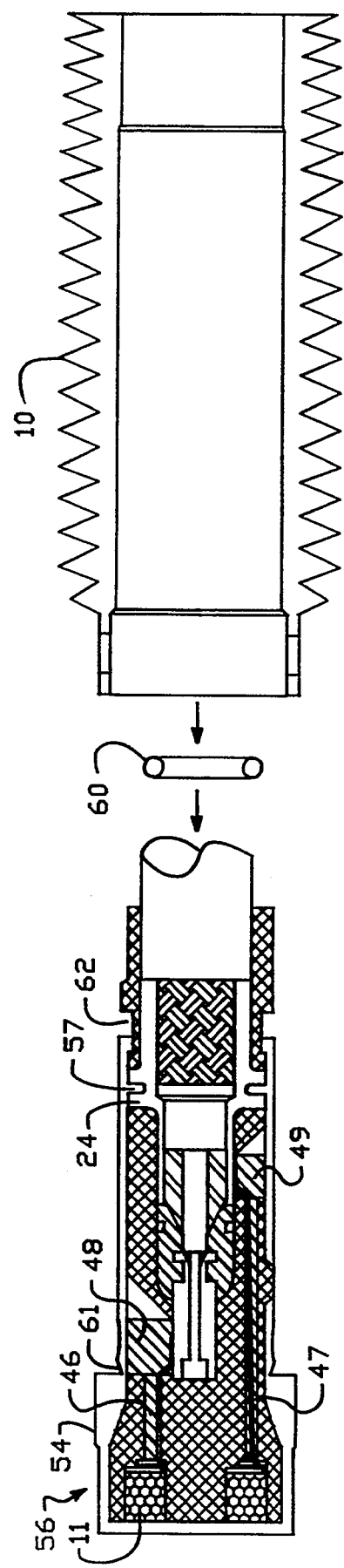
FIG.-6
FIG.-8

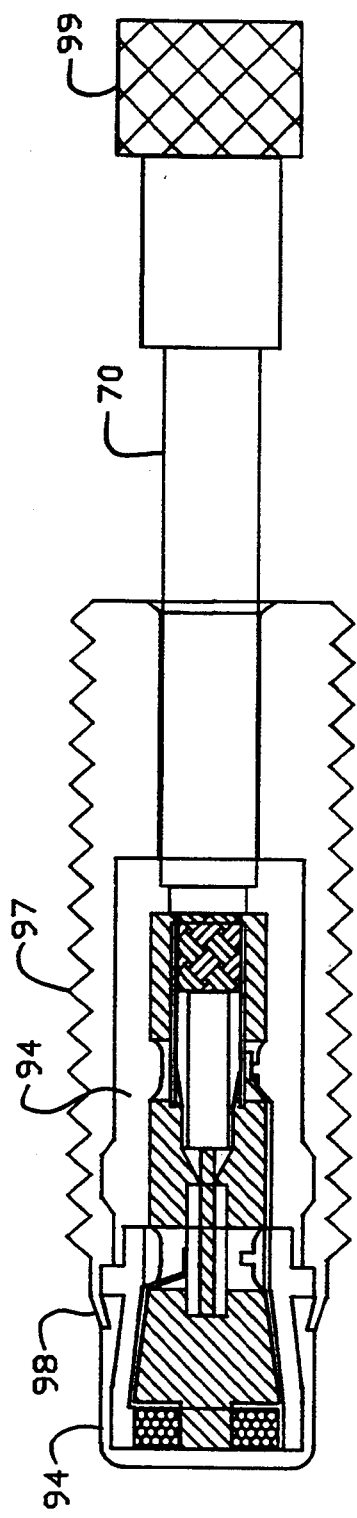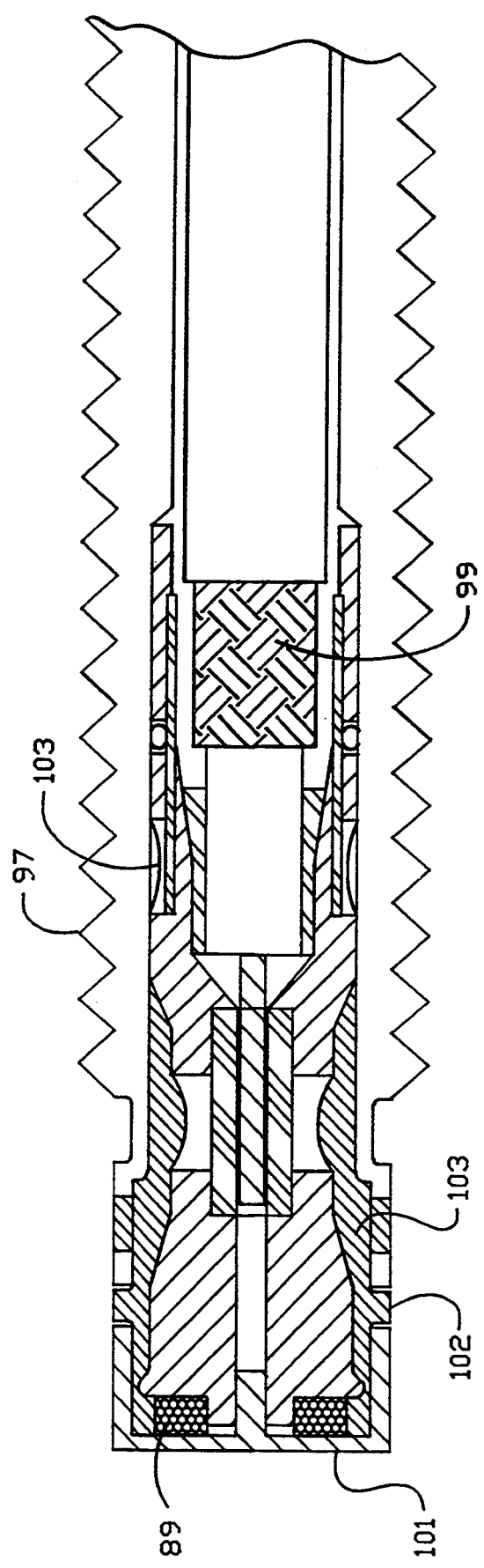

CABLE LOCKING AND SEALING PROCESS FOR SENSOR

This is a continuation-in-part of application Ser. No. 07/887,177 filed May 21, 1992, now abandoned.

The present invention is directed to an improved cable locking and sealing process for a sensor and more specifically to a moisture proof sensor and a process for making such sensor which is used to sense vibration of rotating machinery, temperature sensing and other purposes.

BACKGROUND OF THE INVENTION

For sensing the vibration of motor shafts, for example, of large rotating machinery, a proximity sensor is utilized. Such a sensor has a metal case which contains a sensing coil at one end and has a shielded cable extending out from the other end of the case for connecting to an electrical processing unit. By well known techniques, excessive movement of the shaft indicating unwanted vibration can be sensed. This provides an indication of incipient problems. Such a system with a proximity sensor is at the present time being sold by the assignee of this application, Bently Nevada Corporation of Minden, Nev.

Because of the very adverse ambient conditions such sensor operates under, it must be resistant to heat and moisture and also withstand mechanical stresses such as pulling or twisting on the shielded cable. One sensor which is sold at the present time by the assignee of this application is shown and described in the process patent U.S. Pat. No. 5,016,343 and apparatus patent U.S. Pat. No. 5,021,737.

OBJECTS AND SUMMARY OF THE INVENTION

It is a general object of the present invention to provide an improved sensor and a method of making such sensor.

In accordance with the above object there is provided a process for making a sensor with a sensing coil at one end having at least one lead and a shielded cable extending out of the other end for connecting to an electrical processing unit, the cable having an outer insulating jacket and an outer shielding conductor surrounding an inner insulator carrying at least one interior conductor. The process comprises the steps of trimming an end of the cable so that the jacket and outer shielding conductor is cut away to expose an end segment of the interior conductor. At least one metal cylinder is formed having an inner cavity to accommodate said interior conductor. In one injection molding step with bondable dielectric material, a cylindrical jacket is molded over the cylinder and also provides a coil recess near said cylinder and substantially coaxial therewith and also provides at least one tunnel leading from the recess and terminating at the cylinder. The coil is inserted in the coil recess while inserting the lead through the tunnel and electrically attached to the cylinder. In another injection molding step at least the coil is encapsulated with the bondable dielectric material.

In an alternate technique, in the first injection molding step an annular bobbin recess is also provided and after the recess is formed, a coil is formed in the shape of a bobbin and placed in the recess and its leads welded respectively to the front and back cylinders. After the step of inserting the trimmed cable and fixing it to the back and front cylinders, a protective sleeve is placed over the coil and leads and then in a final injection molding step a cylindrical jacket is molded over the front and back cylinders bonding to the bridging material including forming a cover on the face of the coil and bobbin recess.

BRIEF DESCRIPTION OF DRAWINGS

FIG. 6 is a diagrammatic view of an assembly step.

FIG. 8 is an exploded view illustrating a fourth molding step showing how the sensor of FIG. 1 is produced.

FIG. 20 is a cross-sectional view illustrating the completed invention.

FIG. 21 is a cross-sectional view similar to FIG. 20 of another embodiment of the invention.

DESCRIPTION OF THE PREFERRED EMBODIMENT

Figure 1:
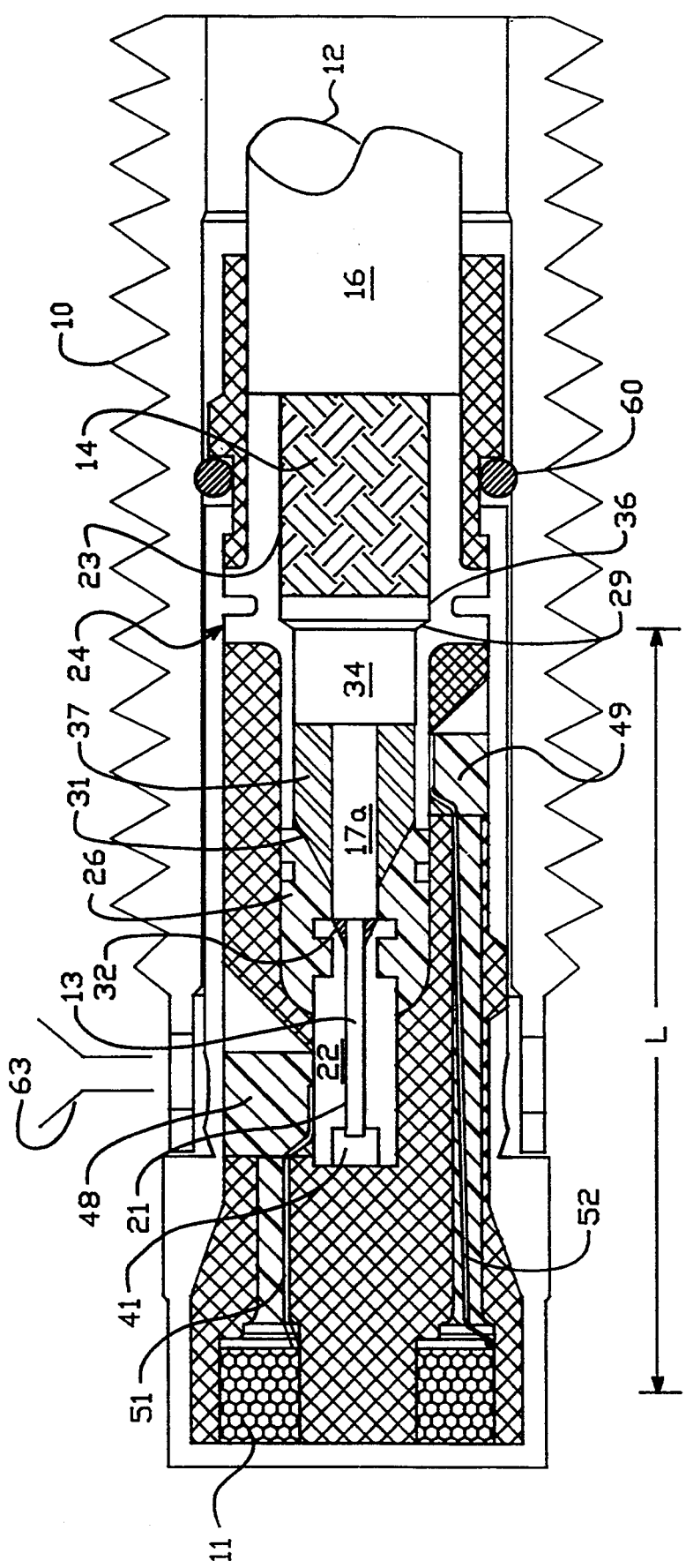
FIG. 1 is an elevational view of a proximity sensor incorporating the present invention which is partially cut away and somewhat simplified.

FIG. 1 shows a cross sectional and simplified cutaway view of the sensor of the present invention. In this embodiment it is a proximity sensor; but the invention is applicable to other sensors such as temperature or velocity as will be discussed below. It includes a metal threaded case 10 having a front end sensing coil 11 (in the form of a bobbin) and towards its back end a coaxial cable 12 which effectively extends from the case 10 for connection to an electronic processing unit which is not shown. In general the coil 11 is in proximity to a rotating shaft and a change of position of the shaft with respect to the coil changes the electrical characteristics of coil 11. This is sensed by the associated electronic processing unit 2, for example, give an alarm signal if eccentric movement of the shaft exceeds a predetermined amount.

Figure 3:
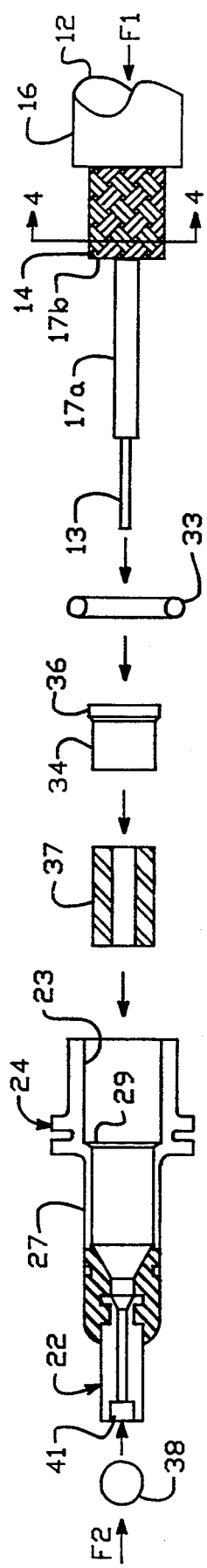
FIG. 3 is a simplified exploded view of a portion of FIG. 1.

The coaxial cable 12 which is also better shown in FIG. 3 is of standard construction (except for minor variation as will be discussed below) and includes a center interior conductor 13, an outer shielding conductor 14 (which in the present embodiment is braided but may be a solid depending on desired flexibility), and an outer insulating jacket 16. Outer conductor 14 and center conductor 13 are separated from one another by an inner cylindrical insulator 17a and 17b. The insulator in this case is in the form of two layers but is typically a single layer in commercially available coaxial cables.

Figure 4:
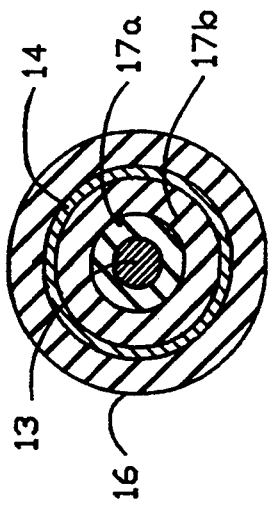
FIG. 4 is an enlarged cross-sectional view taken along lines 4—4 of FIG. 3.

FIG. 4 illustrates these two layers in the cross-sectional view and which is not to scale for purposes of clarity. In general the purpose of the use of the two layer inner cylindrical insulators 17a and 17b is to allow a smaller diameter inner insulating portion 17a so that when it interfaces with the remaining structure, the final diameter of the proximity sensor can be relatively small or miniaturized.

Now referring again specifically to FIG. 1, in its completed form the center conductor 13 extends through the center cavity 21 of a front metal cylinder 22 and has a diameter substantially equal to the diameter of cavity 21. The outer diameter of the outer conductor 14 is substantially equal to the diameter of an inner cavity 23 of a back metal cylinder 24. This is better shown in FIG. 2 where the front and back metal cylinders 22 and 24 are shown by themselves but assembled or interlocked in spaced coaxial proximity by the bridging dielectric material 26. Although not shown in detail in the drawing of FIG. 2 (or for that matter of FIG. 1), the dielectric material forms an interlock with the smaller diameter end 27 of back cylinder 24 by the use of four holes in the end of section 27 which the dielectric material fills.

The interlocked front and back cylinder assembly is actually formed in a first injection molding process where the dielectric material used is polyphenylene sulfide (PPS). Other similar materials are suitable and the use of PPS is not critical. It is a dielectric (thus also an electrical insulating material) which has the characteristic of bonding to itself. The mold for the injection molding process is not shown per se since it is obvious from the construction of FIG. 2. As alluded to above, the back metal cylinder 24 has a smaller diameter inner cavity in the section 27 as opposed to the larger inner cavity 23 which is suitable for mating with the outer conductor 14 (see FIG. 3). These two sections are connected by a stepped transition section 29 which will serve the purpose of physically limiting the insertion of the coaxial cable as will be discussed below.

The bridging section 26 is also formed so that the smaller diameter inner cavity 27 eventually mates with the smaller cavity 21 of the front cylinder 22 by a series of truncated cones 31 and 32 (with the cone 32 being a portion of the front cylinder 22).

Figure 2:
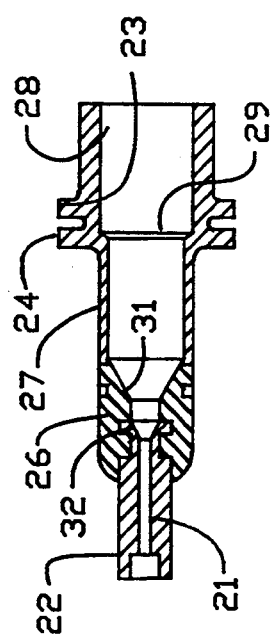
FIG. 2 is a simplified cross-sectional view of a portion of FIG. 1 and which illustrates a first molding step.

In summary, so far, FIG. 2 illustrates a step of the invention where the front and back pair of metal cylinders are formed and then in a first injection molding step they are molded together in spaced coaxial proximity. Next the coaxial cable 12 is trimmed as illustrated in FIG. 3 so that the jacket 16 is cut away to expose outer conductor 14, a portion of the outer conductor is trimmed to expose the inner cylindrical insulator 17a and a portion of this insulator is itself trimmed to expose the end segment 13 of the center conductor. This trimmed cable end is then inserted into the front and back cylinder assembly of FIG. 2 as illustrated by the exploded view of FIG. 3.

However, to provide proper sealing, spacing and for the purpose of moisture proofing, the prepared coaxial cable 12 is first inserted into the solder ring 33, a collar unit 34 which has a stepped end 36, and an elastomeric sleeve 37 which may be of an insulating material such as fluorosilicone rubber. Sleeve 37 has an outer diameter which matches the inner diameter of the smaller diameter cavity 27 of the back cylinder 24. Sleeve 37 fits snugly over the exposed insulator 17a.

Figure 5:
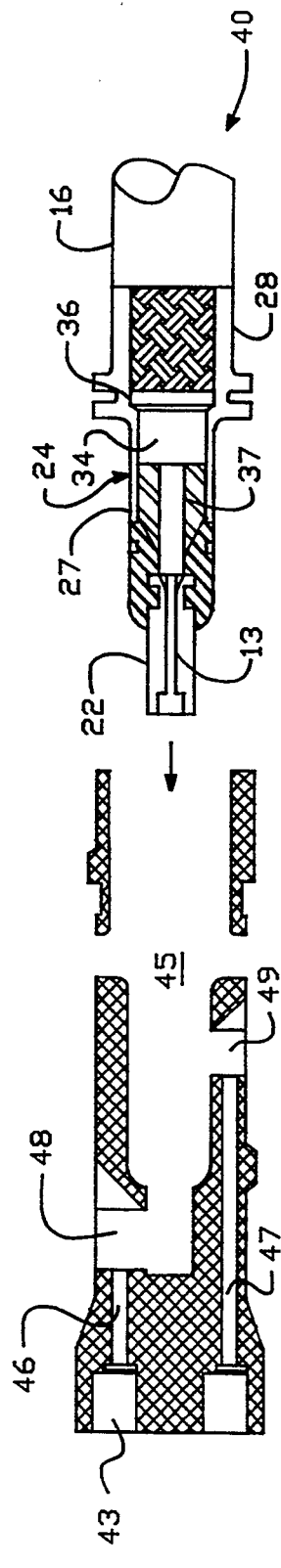
FIG. 5 is a diagrammatic elevational view illustrating a second molding step of the present invention utilizing the structure illustrated in FIG. 3.

The completed assembly of FIG. 3 is shown in both FIGS. 1 and 5 when the entire exploded FIG. 3 is inserted in the front and back metal cylinder assembly 22, 24. As is best shown in FIG. 1, however, when the cable 12 is inserted either manually or by machine, a one pound axial force exerted as shown by the forces F1 and F2, deforms the elastomeric sleeve 37 to completely fill the space in the end portion 27 of the back cylinder 24 and to cause the sleeve to deform against the conical transition 31 of the dielectric bridge 26. And at the other end sleeve 37 abuts against the collar 34.

The above insertion is precisely limited by the mating of the stepped collar end 36 with the step 29 of back cylinder which matches. This provides for a manufacturing repeatability in the electromagnetic characteristics of the entire proximity sensor which in the final assembly must be calibrated.

After the above insertion, a permanent mechanical and electrical connection is made between outer conductor 14 and the inner cavity 23 of back cylinder 24. By the use of inductive heating with the above force F1, F2 being applied, the heating temperature of approximately 450° F. melts the solder ring 33 causing it to flow over the exposed conductor 14 affixing it permanently throughout its length to inner cavity 23. And at the same time the solder provides for a permanent connection of the collar 34 to back cylinder 24. Of course rather than solder, an adhesive or even welding could be used.

Then in a second sequential step the front cylinder 22 and its inner cavity 21 is electrically and mechanically connected to conductor 13 by first placing a measured amount of solder paste, indicated at 38, into the end cavity 41 which flows into inner cavity 21 when heated. The conductor 13 is then inserted and by a similar inductive heating technique a permanent connection is made. Thus the assembly indicated at 40 in FIG. 5 results. As discussed above a suitable adhesive or welding can be used instead of soldering. The measured amount of solder paste 38 helps to provide effective repeatability of the electromagnetic characteristics of the entire proximity sensor especially with respect to the inductance parameter of the coil 11 (illustrated in FIG. 1) which is relatively close to center conductor 13. This repeat-ability will be discussed in detail below.

As is also apparent from a close examination of FIG. 1, the front end portion of the inner cylindrical insulator 17a abuts the end of cylinder 22.

FIG. 5 illustrates a second injection molding step with the same bondable dielectric material where a cylindrical jacket 45 is molded over the front and back cylinders 22 and 24, and also bonds to the bridging material 26. The result of the molding is illustrated by the unit 42 in FIG. 6. As also shown in FIG. 6, the injection molding material extends over the outer insulating jacket 16 to prevent moisture (which causes electrical conduction) from penetrating. Referring back to FIG. 5, in the molding step an annular bobbin recess 43 is provided which is coaxial with the front and back cylinders 22 and 24 along with a pair of parallel tunnels 46 and 47 which terminate as best shown by unit 42 in FIG. 6, at the front cylinder 22 and the back cylinder 24, respectively. Moreover in the molding process appropriate spaces indicated at 48 and 49 are left open so that the leads 51 and 52 of coil 11 may be inserted into the tunnels 46 and 47, respectively, and electrical connection made to front cylinder 22 and back cylinder 24, such connection is illustrated in FIG. 1 at the spaces 48 and 49.

Specifically such electrical connection can be accomplished by resistance welding in a suitable jig where opposed welding electrodes are used at suitable apertures (not shown) left in the dielectric material. And this can be done since the tunnels 46 and 47 are located at a relative 90° to each other.

Referring to FIG. 6, after the coil 11 is formed as a bobbin and inserted into the annular recess 43, the center post 53 of the recess accurately coaxially centers the coil in the recess and locates it axially with respect to the metal portions of the assembly such as the front and back cylinders 22 and 24, and the various conductors. Thus as shown in FIG. 1 by the dimension L between coil 11 and the step 29, the electromagnetic relationship of the coil is repeatedly and precisely fixed with the remaining metal portions of the proximity sensor. This constant dimension between the coil and metal portions thus allows cable 12 to have a predetermined length with perhaps a plus or minus 10% tolerance which is independent of variations in manufactured proximity sensor units. With the final assembly of the entire sensing system including the electronic portion (not shown) the coil 11 forms a portion of an electrical bridge where its variation in inductance and resistance is the critical parameter in sensing eccentric movement of the motor shaft. A final calibration involves balancing the bridge in a manner well known in the art.

Figure 7:
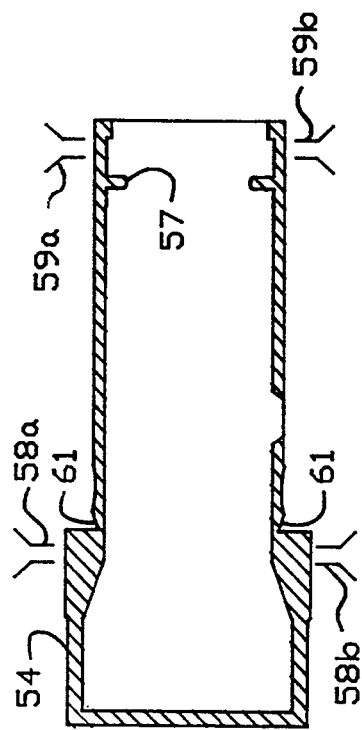
FIG. 7 is a cross-sectional view illustrating a third molding step of the present invention.

FIG. 7 illustrates a third injection molding step where the unit 42 with the bobbin 11 installed at least has its forward portion encapsulated. This includes the bobbin 11 and its recess 43 and referring to FIG. 6 the spaces 48 and 49. Also the tunnels 46 and 47 are filled to prevent moisture entering the assembly. The encapsulation is shown as 54 in FIG. 7 and the final unit of course is illustrated at 56 in FIG. 8 with the shell encapsulation 54. It extends over the end of the coil 11 and over and into a groove 57 in the back cylinder 24. FIG. 7 illustrates the injection molding gates 58a, 58b at the front and 59a and 59b at the rear for forming the encapsulation unit 54. The mold (which of course is the reverse of what is shown in FIG. 7) includes a narrowed ramp portion indicated at 61 which provides for a greater restriction of the material flowing through gates 58a and 58b so that the bobbin recess is first filled and the coil 11 firmly fixed in the recess and then the tunnels 46 and 47 are filled with the PPS material. This sequence prevents the filling of the tunnels first from forcing the bobbin or coil 11 out of its recess during the encapsulation molding process. In addition since the leads 51 and 52 (see FIG. 6) are lying along the tunnels 46 and 47 so that the flow of the molding material is laminar (thus producing only laminar friction) this minimizes or prevent breakage of these leads. Such leads are very fragile being typically 0.035 inches in diameter. At the same time the filling of the tunnels fills in the spaces 48 and 49 where the leads have been welded to respectively the front and back cylinders.

In the last injection molding step of the invention or the fourth, the metal case 10 is placed on the assembly 56 indicated in FIG. 8 along with the O-ring 60 which is inserted in the notch 62. Through gate 63 shown in FIG. 1, PPS material is injected to affix the case to the overall assembly. Since the coil 11 and its leads 51 and 52 have already been securely placed and protected by the previous injection molding step, there is no danger of damage to these portions with the installation of the case. Because of the use of the bondable PPS material, the metal case 10 is effectively affixed to the previously injection molded assembly so that it is mechanically stable and it is sealed to resist moisture leaks which might otherwise affect the electrical characteristics of the coil 11.

As discussed above, in addition to use as a proximity sensor, the present invention may be employed very broadly in the sensing field as, for example, a temperature sensor or a velocity pickup device. For example, when used as a temperature sensor the coil 11 would be a single wire thermocouple of the RTD type which would be molded in the bobbin recess. The protection from moisture and the sealing provided by the foregoing injection molding process and associated seals are still efficacious, and the fragile leads coming from the thermocouple are handled in the same manner. The only change in the process would be the use of perhaps a thinner overall plastic casing in order to provide for a suitable heat transfer to the RTD temperature sensing coil.

Another use is as a velocity pickup where a "geophone" type housing containing a coil and magnet would also be placed in the bobbin recess with associated leads being affixed to the shielded cable and metal cylinder.

From a broad standpoint, the inventive concept relates to any type of shielded cable and associated coil in a case. The cable may only have a single interior conductor which would extend into the inner cavity 21 of a single cylinder. And then the injection molding would provide in a first step both a recess for the sensing coil and a plastic connection to the metal cylinder. And then in another injection molding step the coil would be encapsulated to protect it from both physical harm and from moisture.

Thus in summary the present invention with its four step injection molding process and associated seals such as the elastomeric seal 37 and the collar 34 provides a very efficient manufacturing alternative to the use of many separate parts. At the same time, the manufacturing process allows for rigorous and/or precise control of dimensions so that the electrical and mechanical characteristics of each manufactured sensor are repeatable. As discussed above the injection molding process allows the necessary mechanical and electrical connections to be made to a metal cylinder or other similar device to provide for durability of the unit as far as resisting axial and torsional forces. And then the injection molding provides for the coupling to either one or both cylinders, whatever is the case, and at the same time makes a convenient and accurately positioned recess for the sensing coil. Finally the sensing coil which is by its nature whether it is used for proximity, temperature or velocity, is very fragile and the injection molding allows for protection and encapsulation of the coil and also protection of the relatively fine leads.

Lastly, especially in conjunction with the invention's use as a proximity sensor, very close control of tolerances are provided (as illustrated by the dimension L in FIG. 1) so that the electrical characteristics and specifically the inductance of the coil can be predetermined so that the related electrical instrumentation, for example, to detect vibration parameters is easily calibrated.

Figure 10:
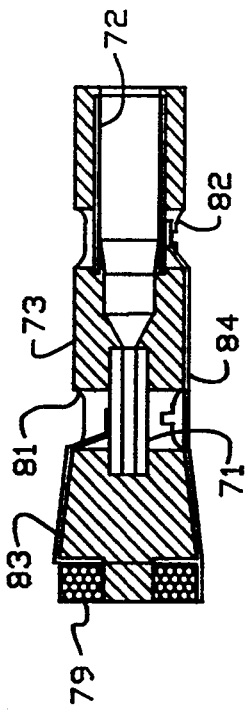
FIG. 10 is a cross sectional view illustrating the combination of portions of FIG. 9.
Figure 9:
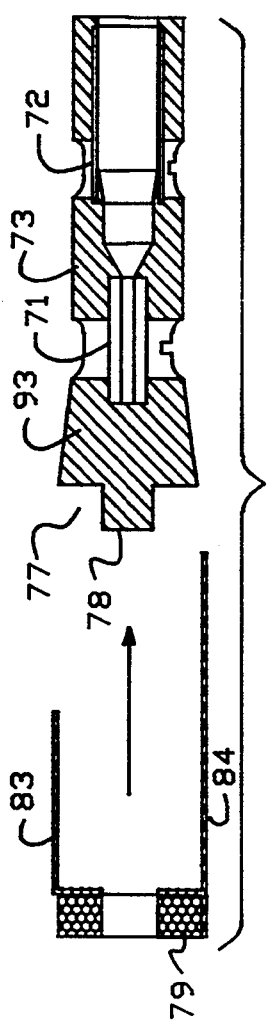
FIG. 9 is a cross-sectional view of apparatus of the present invention illustrating the steps of the invention.

FIGS. 9 through 21 illustrate another embodiment of the invention which includes a front cylinder 71 and back cylinder 72, both of conductive metal, which have been molded together in spaced coaxial proximity by the dielectric connector 73. As is true in the case of the previous embodiment, the inner diameters of the cylinders 71 and 72 will match the center conductor 74 (see FIG. 11) of the coaxial cable 70 and the outer conductor 76. In addition the cable is trimmed in the same manner as above. However, in the injection molding step, an annular recess is also formed at 77 by the dielectric material 73 which includes a center post 78 on which as illustrated in FIGS. 9 and 10 also, a coil 79 is placed. The dielectric material 73 contains suitable apertures as shown at 81 and 82 which allow the leads 83 and 84 to be respectively resistance welded to the cylinders 71 and 72 as shown in FIG. 10.

Figure 11:
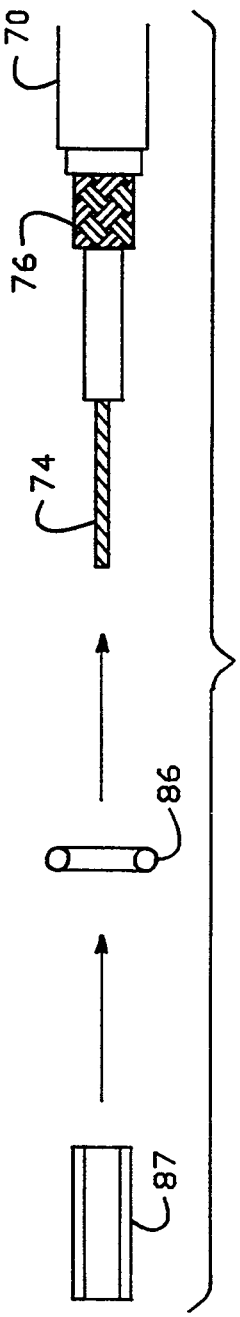
FIG. 11 is an exploded view illustrating another step of the invention.
Figure 12:
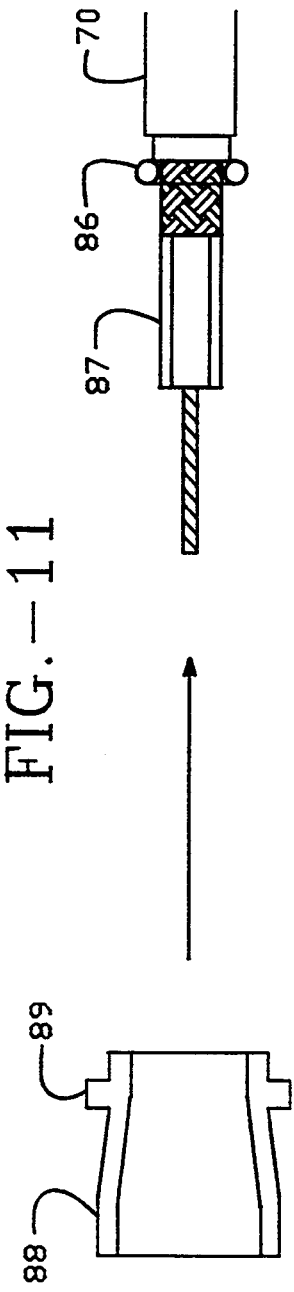
FIG. 12 is an exploded view illustrating another step of the invention.

Referring to FIG. 11 the prepared coaxial cable 70, which of course has been prepared as in the previous embodiment, has placed on it a solder preformed ring 86 and a plastic protector sleeve 87 as illustrated in the assembled drawing of FIG. 12. Sleeve 87 acts as a moisture seal for the coaxial cable.

Figure 13:
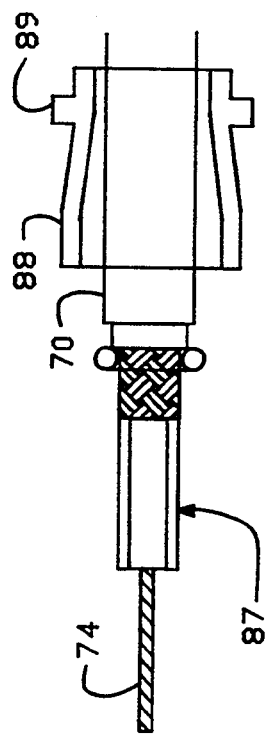
FIG. 13 is an elevational showing the completion of the steps of FIGS. 11 and 12.

Next in FIG. 12 a plastic type conically shaped sleeve 88 is formed with a series of peripheral lugs 89 and as illustrated in FIG. 13 placed on cable 70 for later use. In addition, as illustrated in FIG. 13, a silicon lubricant is applied to moisture seal 87.

Figure 14:
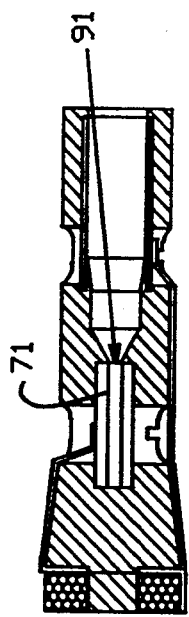
FIG. 14 is a cross-sectional view similar to FIG. 10 illustrating another step of the invention.
Figure 15:
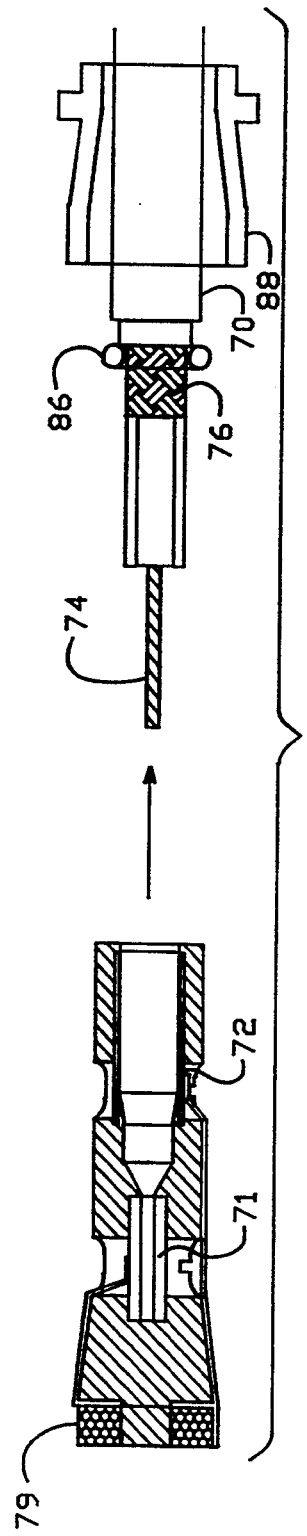
FIG. 15 is a cross-sectional view illustrating another step of the invention and the combination of the elements of FIGS. 13 and 14.
Figure 16:
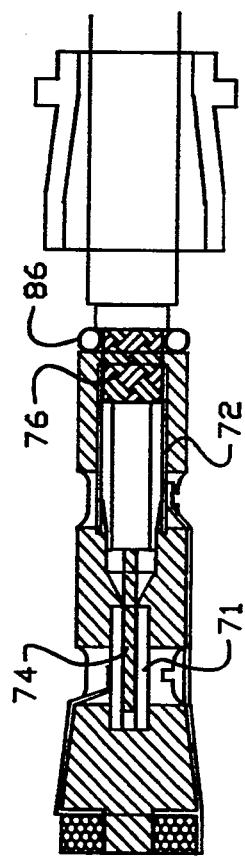
FIG. 16 is a cross-sectional view of showing the combination of units of FIG. 15.
Figure 17:
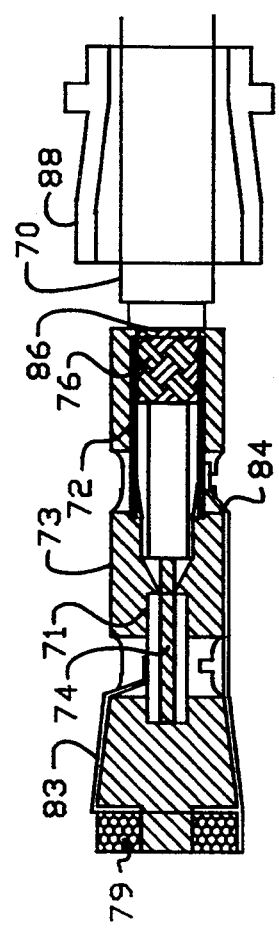
FIG. 17 illustrates another step of the invention.

Referring to FIG. 14 the assembly previously assembled in FIG. 10 has solder paste, indicated at 91, applied to the inside of the front cylinder 71. Then as illustrated in FIGS. 15 and 16 the prepared assembly of molded together front and back cylinders 71, 72 with the coil 79 in recess 77 is mated with the assembly of FIG. 13. One slides into the other as illustrated in FIG. 16 with inner conductor 74 in cylinder 71 and outer conductor 76 in cylinder 72; the completed unit is positioned in an inductive heating unit. FIG. 17 illustrates the results of such heating where the solder ring 86 (referred to in FIG. 16) has now permeated into the braided material 76 of the cable 70 to effectively electrically and mechanically affix the braid to the rear cylinder 72; and in addition, as illustrated, for the center conductor 74, the solder paste 91 previously applied has completely filled the cavity of the front cylinder 71 to again electrically and mechanically affix this center conductor to the front cylinder. At the same time electrical contact has, of course, been made with the two leads 83 and 84 and the coil 79.

Figure 18:
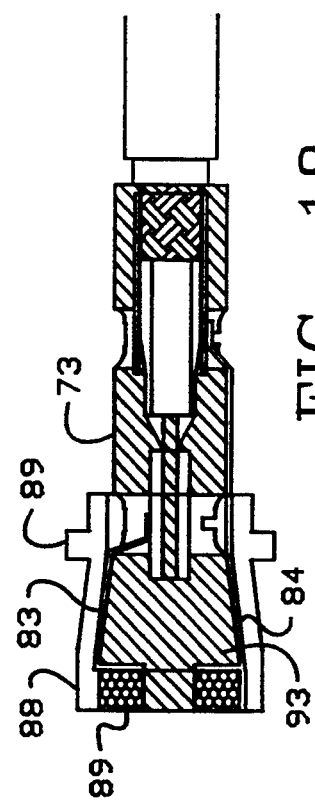
FIG. 18 is a cross sectional view showing the combination of the exploded portions of FIG. 17.

The protective sleeve 88 as illustrated in FIG. 17, which was initially installed in the step of FIG. 15 before the cable 70 was attached to the dielectric assembly, is now slid into the position shown in FIG. 18 and secured there both by an adhesive which is applied and by the wedging action of its conical shape against the conical envelope 93 of the dielectric material 73 which was formed in the initial step of the invention shown in FIG. 9. As is clear from examination of FIG. 18, the protective sleeve covers the relatively fragile conductors or leads 83 and 84 of the coil 89. In addition, the periphery of the coil 89 is also protected and centered by the sleeve.

Figure 19:
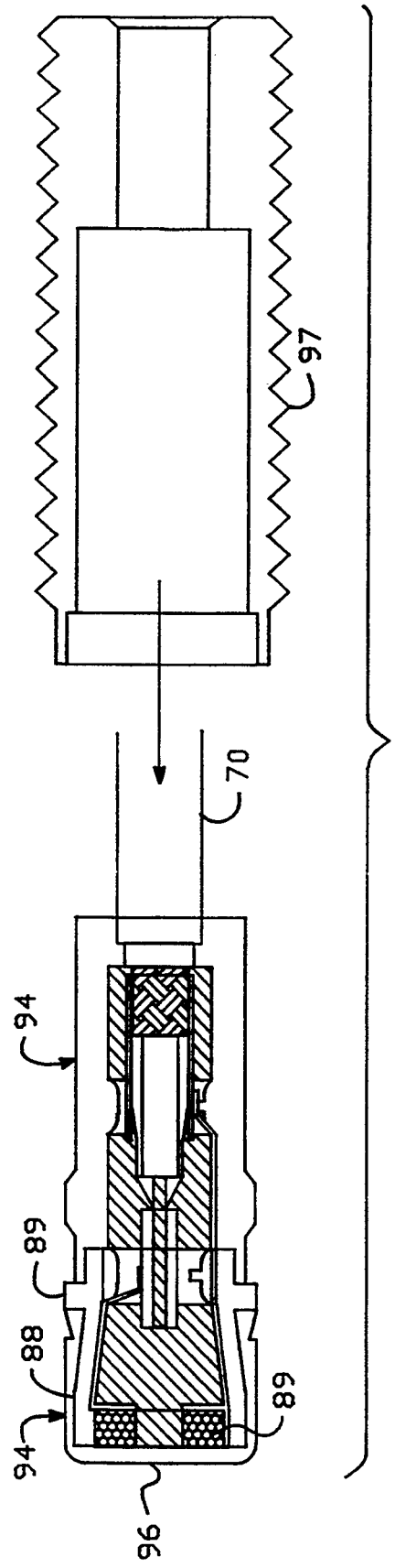
FIG. 19 is an exploded cross-sectional view showing another step in the invention.

The next step as shown in FIG. 19 is an encapsulation step where the entire assembly of FIG. 18 is placed in an encapsulation mold. Here the final encapsulation is illustrated by the cylindrical jacket 94 which, of course, is the result of the negative mold (not shown) which has surrounded it. The molding process thus completes the attachment of the sleeve 88 to the remainder of the assembly. Also the mold material is the same bondable dielectric material which is used in the original material 73.

In the molding process the lugs 89 of the sleeve 88 provide for accurate thickness control of the face 96 of the cylindrical jacket which forms a cover over the front of the coil 89. Thus by the use of the lugs 89 the thickness of the cover 96 can be accurately controlled. This is important in a proximity sensor since the spacing from the rotating shaft is critical. In addition the sleeve 88 during the molding process insures that the coil 89 is still centered and concentric within the entire encapsulation 94. Thus the lugs 89 again provide limits in the holding process. Another advantage of the sleeve 88 is that it serves as a protector of coils and leads from the high pressure molding fluid.

Finally as illustrated in FIGS. 19 and 20, a threaded metal case 97 is slid onto the cable 70 and meshed by crimping 98 to the envelope 94. And also as illustrated in FIG. 20 a connector unit 99 is placed on cable 70.

FIG. 21 illustrates a variation of the molding step of FIG. 19 where before such molding a preformed plastic cap 101 is placed over coil 89 and that end of the assembly; the metal case 97 is also slid into place. Then through appropriate gates 102, the molding and encapsulation takes place, where a cylindrical jacket 103 is formed to lock into place both case 97 and cap 101. Thus, this second molding step serves two purposes.

Thus an improved process for forming a proximity sensor has been provided.

What is claimed is:

1. A process for making a proximity sensor having a metal case with a sensing coil at one end and a coaxial cable extending out of the other end for connecting to an electrical processing unit, the coaxial cable having an outer insulating jacket and a wire braid outer conductor surrounding an inner cylindrical insulator carrying a center conductor, the process comprising the following steps:

trimming an end of said coaxial cable so that said jacket is cut away to expose said outer conductor, which has a predetermined outer diameter, and trimming a portion of said outer conductor and inner cylindrical insulator to expose an end segment of said center conductor, which has a predetermined diameter;

forming a front and back pair of metal cylinders with said front cylinder having an inner cavity with a diameter substantially matching the diameter of said center conductor and said back cylinder having an inner cavity with a diameter substantially matching the diameter of said outer conductor;

in a first injection molding step molding together in spaced coaxial proximity with a bridging dielectric material which bonds to itself, said front and back metal cylinders;

inserting said trimmed cable end into said inner cavities of said molded together front and back cylinders and mechanically and electrically connecting said outer conductor to said back cylinder and said center conductor to said front cylinder to resist axial forces;

in a second injection molding step with said bondable dielectric material, molding a cylindrical jacket over said front and back cylinders and bonding to said bridging material, said second molding providing an annular bobbin recess near said front cylinder and coaxial therewith and also providing a pair of parallel tunnels leading from said recess with one tunnel terminating at said front cylinder and the other terminating at said back cylinder;

forming said coil into the shape of a bobbin with two leads and inserting said coil in said bobbin recess while inserting said leads through said tunnels, and electrically attaching said leads to said front and back cylinders respectively;

in a third injection molding step encapsulating at least said coil;

inserting the assembly of the above steps into said metal case;

and in a fourth injection molding step affixing said case to said assembly with said bondable dielectric material.

2. A process as in claim 1 where in said inserting step said back cylinder is first connected to said outer conductor with use of a solder ring, and application of heat and a axial force and then said front cylinder is connected to said center conductor.

3. A process as in claim 2 where a measured amount of solder paste is placed into said front cylinder cavity which is heated to make said connection of said center conductor.

4. A process as in claim 2 including the step of abutting a collar with a stepped end against said end of said exposed outer conductor, said stepped end having an outer diameter matching the outer diameter of said outer conductor, said back cylinder's inner cavity including a matching step serving as a transition to a smaller diameter inner cavity, said step mating with said stepped end to limit said insertion.

5. A process as in claim 1 where in said second injection molding step said cylindrical jacket extends to and over said outer insulating jacket.

6. A process as in claim 1 where in said third injection molding step said dielectric material fills spaces where said leads are attached to said front and back cylinders and fills said tunnels to thereby electrically insulate said front and back metal cylinders.

7. A process as in claim 6 where in said third injection molding step said bobbin recess is first encapsulated and then said tunnels are filled to prevent such filling of tunnels from forcing said bobbin out of said recess.

8. A process as in claim 7 where said filling of said tunnels exerts only laminar friction against said leads in said tunnels to prevent breakage of said leads.

9. A process as in claim 7 where a higher resistance to said material flow to said tunnels compared to said recess is provided.

10. A process as in claim 9 where said higher resistance is provided by a narrowed path.

11. A process as in claim 1 where in said trimming step a portion of said inner cylindrical insulator between said center and outer conductors is exposed and where in said inserting step an insulating elastomer sleeve is placed over said exposed portion of said inner insulator.

12. A process as in claim 4 where in said trimming step a portion of said inner cylindrical insulator between said center and outer conductors is exposed and where in said inserting step an insulating elastomer sleeve is placed over said exposed portion of said inner insulator, said sleeve abutting against said collar, said sleeve having an outer diameter matching the inner diameter of the smaller diameter cavity of said back cylinder, the other end of said sleeve abutting against said bridging dielectric to provide a moisture seal.

13. A process as in claim 11 where said inner cylindrical insulator is formed of two layers with the relative outer layer spacing said outer conductor from the relative inner layer which provides said exposed portion of said inner insulator.

14. A process for making a sensor with a sensing coil at one end and a shielded cable extending out of the other end for connecting to an electrical processing unit, the cable having an outer insulating jacket and an outer shielding conductor surrounding an inner cylindrical insulator carrying at least one center conductor, the process comprising the following steps:

trimming an end of said cable so that said jacket is cut away to expose said outer conductor, which has a predetermined outer diameter, and trimming a portion of said outer conductor and inner cylindrical insulator to expose an end segment of said center conductor, which has a predetermined diameter;

forming a front and back pair of metal cylinders with said front cylinder having an inner cavity with a diameter substantially matching the diameter of said center conductor and said back cylinder having an inner cavity with a diameter substantially matching the diameter of said outer conductor;

in a first injection molding step molding together in spaced coaxial proximity with a bridging dielectric material which bonds to itself, said front and back metal cylinders;

inserting said trimmed cable end into said inner cavities of said molded together front and back cylinders and mechanically and electrically connecting said outer conductor to said back cylinder and said center conductor to said front cylinder to resist axial forces;

in a second injection molding step with said bondable dielectric material, molding a cylindrical jacket over said front and back cylinders and bonding to said bridging material, said second molding providing an annular bobbin recess near said front cylinder and coaxial therewith and also providing a pair of tunnels leading from said recess with one tunnel terminating at said front cylinder and the other terminating at said back cylinder;

forming said coil into the shape of a bobbin with two leads and inserting said bobbin in said bobbin recess while inserting said leads through said tunnels and electrically attaching said leads to said front and back cylinders respectively.

15. A process for making a sensor with a sensing coil at one end having at least one lead and a shielded cable extending out of the other end for connecting to an electrical processing unit, the cable having an outer insulating jacket and an outer shielding conductor surrounding an inner insulator carrying at least one interior conductor, the process comprising the following steps:

trimming an end of said cable so that said jacket and outer shielding conductor is cut away to expose an end segment of said interior conductor;

forming at least one metal cylinder having an inner cavity to accommodate said interior conductor;

in one injection molding step with a bondable dielectric material, molding a cylindrical jacket over said cylinder and providing a coil recess near said cylinder and substantially coaxial therewith and also providing at least one tunnel leading from said recess and terminating at said cylinder;

inserting said coil in said coil recess while inserting said lead through said tunnel and electrically attaching said lead to said cylinder;

and in another injection molding step encapsulating at least said coil with said dielectric material.

16. A process for making a sensor with a sensing coil at one end and a shielded cable extending out of the other end for connecting to an electrical processing unit, the cable having an outer insulating jacket and an outer shielding conductor surrounding an inner cylindrical insulator carrying at least one center conductor, the process comprising the following steps:

trimming an end of said cable so that said jacket is cut away to expose said outer conductor, which has a predetermined outer diameter, and trimming a portion of said outer conductor and inner cylindrical insulator to expose an end segment of said center conductor, which has a predetermined diameter;

forming a front and back pair of metal cylinders with said front cylinder having an inner cavity with a diameter substantially matching the diameter of said center conductor and said back cylinder having an inner cavity with a diameter substantially matching the diameter of said outer conductor;

in a first injection molding step molding together in spaced coaxial proximity with a bridging dielectric material which bonds to itself, said front and back metal cylinders and providing in such molding step an annular bobbin recess near said front cylinder;

forming said coil into the shape of a bobbin with two leads and inserting said bobbin in said bobbin recess and welding said leads respectively to said front and back cylinders;

inserting said trimmed cable end into said inner cavities of said molded together front and back cylinders and mechanically and electrically connecting said outer conductor to said back cylinder and said center conductor to said front cylinder to resist axial forces;

fixing a protective sleeve over said coil and leads;

in a second injection molding step with said bondable dielectric material, molding a cylindrical jacket over said front and back cylinders and bonding to said bridging material including providing a cover over the face of said coil and bobbin recess.

17. A process for making a sensor as in claim 16 where in said first molding step a conical envelope of material is formed over said front cylinder and where said protective sleeve is conically shaped to mate therewith.

18. A process for making a sensor as in claim 16 including the step of inserting the assembly of the above into a metal case.

19. A process for making a sensor as in claim 16 where said bobbin recess is formed by a central post on which said coil is placed whereby said sleeve protects the periphery of said coil and centers it in said second molding step.

20. A process as in claim 16 where in said second injection molding step said cover over the face includes a preformed cap which is fixed by said molding and the above assembly is first inserted into a metal case whereby said cylindrical jacket is formed between said case and said assembly.

21. A process as in claim 16 where said cover is formed as part of said cylindrical jacket.

* * * * *